3,579,726
TEMPLATE ASSEMBLY
Herbert G. Vore and Donald E. Bardsley, Nashua, N.H., assignors to Improved Machinery Inc., Nashua, N.H.
Filed July 25, 1968, Ser. No. 747,687
Int. Cl. B29c 1/00, 23/00; B29f 1/10
U.S. Cl. 18—5
16 Claims

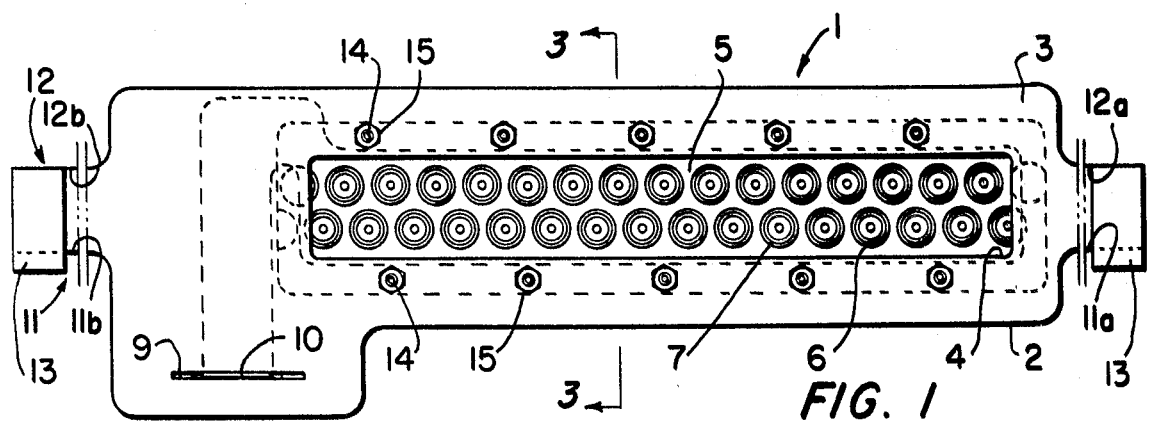
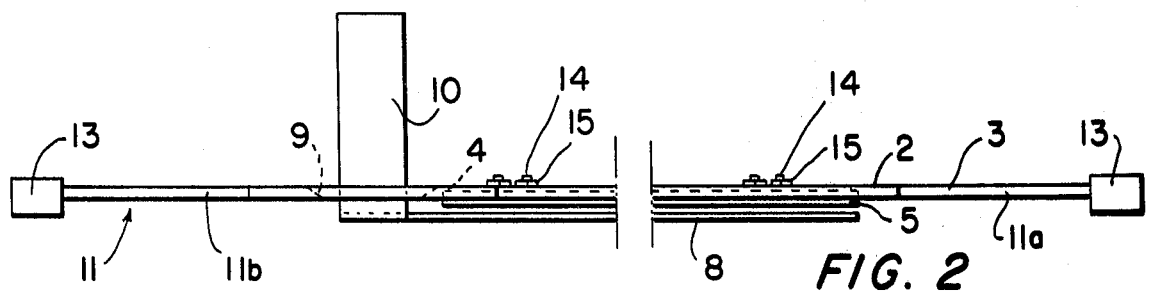
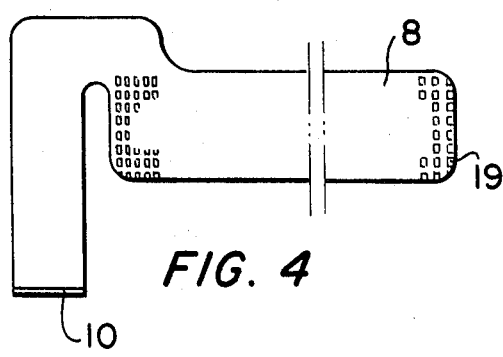
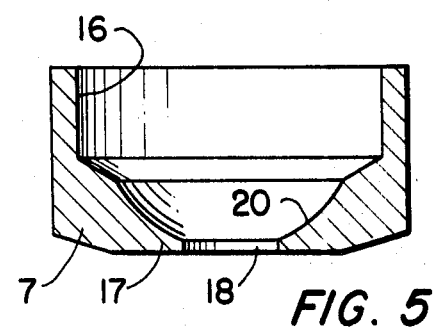
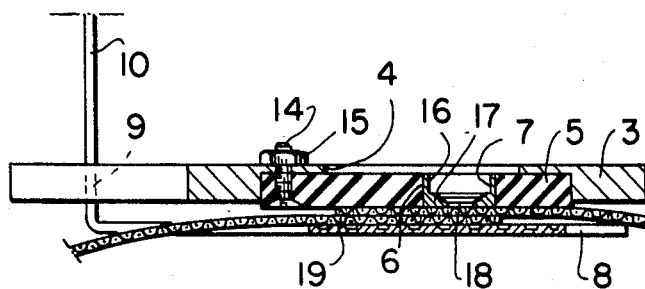
INVENTORS
HERBERT G. VORE
DONALD E. BARDSLEY

United States Patent Office 3,579,726
Patented May 25, 1971

ABSTRACT OF THE DISCLOSURE

A template assembly for guiding the nozzle of a plastic molding apparatus which assembly has resiliently mounted sockets for engaging and locating the nozzle, for spacing the nozzle from the workpiece, for transmitting fluidized or plasticized and pressured plastic therethrough, to the workpiece, and for transmitting the force of the molding apparatus to the workpiece; a back-up plate providing a bearing surface for the workpiece, and for forming a rivet-type head of the molding plastic "slug" beneath the workpiece; and an alignment edge and stop for orienting the workpiece relative to the nozzle.

---

This invention pertains to a template assembly for use with a workpiece, and a workpiece-processing apparatus, and especially to a template assembly usable with a plastic molding apparatus for guiding the nozzle of said apparatus relative to the workpiece, for admitting fluidized plastic therethrough, and for transmitting the force and weight of a molding apparatus to the workpiece.

It is conventional in the prior art to direct a molding apparatus and the nozzle thereof toward the workpiece for contacting engagement therewith so as to communicate the plasticized plastic material from the nozzle to the workpiece. However, in some operations this is frequently undesirable. For example, in the fabrication of some articles of manufacture it is customary to use a strip of porous, thermoplastic material which must be formed into an annulus in which the ends of the strip must be overlapped and sealed with plastic "slugs." In such a manufacturing process it is undesirable, for being harmful to the article of manufacture, to cause the heated nozzle of the molding apparatus to contact the thermoplastic strip. Accordingly, it is necessary to have some means for disposing the nozzle of the molding apparatus in immediate adjacency to, albeit spaced from, the thermoplastic strip with means which nonetheless accommodate for the communication of the plastic to the overlapped ends. Also, it is sometimes a condition that compressive, porous material comprises the workpiece. In this circumstance the admitting of fluidized plastic material to the porous medium will allow the plastic to flow throughout the medium via the interstices thereof (because of its porosity) and the localizing or confinement of the plastic material to one or more given areas is frustrated. Therefore, it would be extremely useful to have means for compressing the porous medium in a manner which defines a molding cavity into which the plasticized plastic can be admitted and confined. Additionally it would be useful to have a device for patterning or ordering the plasticizing of a workpiece, the device having structure for positioning the nozzle relative to the workpiece so as to establish the correct pattern. Accordingly, it is an object of this invention to provide a template assembly for guiding the nozzle of a plastic molding apparatus relative to a workpiece which has means for engaging and positioning the nozzle in immediate adjacency to the workpiece.

It is another object of this invention to provide a template assembly with means for protecting the workpiece from the heated nozzle. Another object of this invention is to provide a template assembly with means for transmitting pressured, fluidized plastic to the workpiece.

Another object of this invention is to provide a template assembly with means for transmitting the force of the molding apparatus to the workpiece.

Another object of this invention is to provide a template assembly for guiding the nozzle of a plastic molding apparatus relative to a workpiece with means for effecting correct alignment of the workpiece relative to the nozzle.

A feature of this invention comprises a template assembly having resiliently mounted and apertured sockets for engaging and locating the nozzle of a molding apparatus, and for spacing the nozzle from the workpiece. Another feature of this invention comprises the use of a back-up plate as a bearing surface for the workpiece, the back-up plate also serving as a molding surface for forming a rivet-type head, of a plastic "slug," under the workpiece. Yet another feature of this invention comprises, the provisioning of an alignment edge and stop on a template assembly for orienting a workpiece relative to the nozzle of a plastic molding apparatus.

Further objects and features of this invention will become more apparent by reference to the following description taken in conjunction with the accompanying figures in which:

FIG. 1 is a plan view of a template assembly according to the invention;

FIG. 2 is a front elevation of the template assembly of FIG. 1;

FIG. 3 is a vertical section of the template assembly taken along the section line 3—3 of FIG. 1;

FIG. 4 is a plan view of the back-up plate; and

FIG. 5 is an enlarged view, in vertical section, of the socket in FIG. 3.

As shown in FIG. 1 the template assembly 1 comprises a jig 2 for interposition between the workpiece and the nozzle of a plastic molding apparatus. The jig 2 comprises a framing plate 3 which has an aperture or opening 4 formed in the center thereof. Opening 4 is provided to receive therewithin a template pattern 5, which pattern has formed therein a plurality of bores 6. The bores 6 are provided to accommodate therewithin apertured sockets 7.

As shown more clearly in FIG. 2 the template assembly 1 includes a back-up plate 8 which is coupled to the framing plate 3 by means of a narrow slot 9 formed through the framing plate. Slot 9 receives a perpendicularly-extending, flat tang 10 which is formed in one end of back-up plate 8. Tang 10 is provided, for penetration of slot 9, properly to locate and orient back-up plate 8 below sockets 7.

As shown in FIGS. 1 and 2 framing plate 3 has alignment edges 11 and 12 which comprise either lateral surfaces of the ends of the framing plate and include edges 11a and 11b, and 12a and 12b. Edges 12a and 12b are provided for the alignment of a first end, an underlying end, of a strip of the workpiece, and edges 11a and 11b are provided for the alignment of the overlapping other end of the strip, to assure the proper disposition of sockets 7 above the overlapped strip ends. This arrangement is shown in FIG. 3 where a strip-type workpiece is shown in dashed-line outline, the ends thereof overlapped under a socket 7. The cubical blocks 13, shown in FIGS. 1 and 2, are provided as stops for locating the lateral edges of the lap of a strip-type workpiece formed into an annulus. In the embodiment of the template assembly 1 shown, blocks 13 are integral with framing plate 3. Clearly, this need not be. Blocks 13 can well be formed with slots, to receive therethrough the terminal extensions of plate 3, having set-screws, or the like, for adjustably setting the spacing therebetween—to accommodate workpieces of varying widths. Such adjustability is a matter of choice.

Machine Screws 14 and hex nuts 15 secure the template pattern 5 in opening 4 and fasten the pattern to the framing plate 3.

Sockets 7, for being sockets, have inner side walls 16 (FIG. 3) positionally to engage the nozzle of the plastic molding apparatus and to restrain said nozzle against lateral movement. Additionally, said sockets 7 have lands 17 which have apertures 18 in the center thereof to admit the plasticized plastic therethrough. Lands 17 allow the positioning of the nozzle immediately adjacent the workpiece, but protectively spaced therefrom. Accordingly, a workpiece of thermoplastic or whatever composition is not contacted by the heated nozzle of the molding apparatus, and for the brief period during which the nozzle is engaged therein, the socket 7 serves as a heat sink.

Template pattern 5 is formed of resilient material; it may be made of rubber, or some elastomeric synthetic, or equivalents. Thus, sockets 7, under the pressure of a molding apparatus which is nozzle-engaged therewith, are slightly displaceable relative to the framing plate 3. The sockets 7 will move toward the back-up plate 8 because of the yielding nature of resilient pattern 5, in which they are located. This has a particular advantage when the workpiece being processed is of porous and compressible qualities. This advantage, alluded to earlier in this specification, subsists in the ability to confine the plastic to a given molding cavity. In that the workpiece is compressible, and the sockets 7 are displaceable, the lands 17 compress an annulus of the workpiece. The interstices which obtain in the compressed annulus are constricted, and flow of fluidized plastic therethrough is inhibited. What remains, then, is a molding cavity ringed by land-compressed material. The cavity is defined by the walls of aperture 18, and locates centrally thereof non-compressed circles of the overlapped ends of the workpiece into the interstices of which the fluidized plastic can freely flow.

As evidenced in FIG. 1, template pattern 5 presents sockets 7 in bores 6 in a given geometric pattern, but this is quite arbitrary. The purpose here is to give a preferred embodiment of our invention. Clearly, the broad teaching of our invention, the provisioning of jig means with means for engaging and positioning the nozzle in immediate adjacency to the workpiece, can be practiced to effect moldings in any geometric pattern without departing from the spirit of our teaching.

The use of a template assembly, according to our invention, will be carried out on a bearing surface for the accommodation of the workpiece. Yet, it will occur that, in treating of porous workpieces, for instance, it is desirable to form irregularities in the rivet-type head or crown of the plastic "slug" or product which forms beneath such porous workpieces. It is for this reason that back-up plate 8 is provisioned as a workpiece bearing surface—and provisioned further, as shown in FIG. 4, with a knurled surface 19, i.e., a molding surface for the "slug" head. Either smooth surfaces, or surfaces of discontinuous characteristics other than that of knurls, can be provided in a back-up plate, in accord with our teaching. This is a matter determined by the type of workpiece to be processed.

Additionally, edges 11a, 11b, 12a, and 12b are lateral surfaces occurring at the ends of framing plate 3. These alignment edges serve the binding of strip-type workpieces into annuluses. But they represent only one embodiment of our disclosure of alignment-effecting means. This illustrated application teaches a means of effecting a correct alignment of the workpiece relative to the nozzle of the molding apparatus—ultimately to effect positioning and repetitive re-positioning of the nozzle relative to the workpiece to carry out the predetermined molding pattern. Surely, other alignment-effecting means will occur to those skilled in this art, from our teaching.

With the illustration in FIG. 5 we exemplify a preferred embodiment of a socket 7. In being resiliently mounted, as earlier noted, the socket 7 is displaceable relative the framing plate 3. Accordingly, it will transmit the weight and force of the molding apparatus to the workpiece. Land 17 has given inside and outside diameters. This provides a given land area to derive a compression of a given area of a porous, compressible workpiece. The workpiece area of compression is variable, of course, by employing sockets 7 with varied i.d. and o.d. dimensions. Thus, as the type of material warrants it, sockets 7 having different-dimensioned lands 17 are disposed in template pattern 5.

Land 17 forms a seal against the surface of the workpiece to confine the fluidized, pressured plastic. An arcuate portion 20 of walls 16, occurring immediately adjacent to aperture 18, controls the location of the nozzle of the molding apparatus. The portion 20 has a given greater radius which is slightly larger than the given greater radius of the correspondingly-shaped nozzle of the molding apparatus. Portion 20, then, forms a seal between the nozzle and socket 7. The sealing effects of land 17 and portion 20, therefore, contain the fluidized, pressured plastic at the entrance of aperture 18, and insure that the plastic is admitted only through the aperture.

The arcuate shape of portion 20 contemplates use of the template assembly 1 with molding apparatus, of conventional design, which have nozzles of complementary configuration. Of course, portion 20 may be linearly tapered, or of other configuration, to accommodate less conventionally shaped nozzles, without departing from the spirit of our invention.

Accordingly, while we have described our invention in connection with a specific embodiment thereof, it is to be clearly understood that this is done only by way of example and not as a limitation to the scope of our invention as set forth in the objects thereof and in the accompanying claims.

We claim:

1. A template assembly, for guiding the nozzle of a plastic molding apparatus relative a workiece, comprising:
   jig means for interpositioning between the workpiece and the apparatus; and
   means coupled to said jig means for engaging and positioning the nozzle in immediate adjacency to the workpiece; wherein
   said jig means includes means resiliently mounting said nozzle engaging/positioning means and responsive to engagement of said nozzle engaging/positioning means by a nozzle to cause said nozzle engaging/positioning means to move into and compress the workpiece, to define a molding cavity in the workpiece for localizing thereat plastic admitted thereinto by the molding apparatus, and to cause withdrawal from the workpiece only upon disengagement of said nozzle from said nozzle engaging/positioning means, said nozzle engaging/positioning means formed of resilient material.

2. A template assembly, according to claim 1, wherein: said nozzle engaging/positioning means includes means for protecting the workpiece from the nozzle.

3. A template assembly, according to claim 1, wherein: said nozzle engaging/positioning means comprises socket means, said socket means comprising an annular guide for engagingly constraining the nozzle against lateral movement and a land for spacing between the nozzle and the workpiece, said land having an aperture formed therein for admitting plastic therethrough from the nozzle to the workpiece.

4. A template assembly, according to claim 3, wherein: said jig means includes a framing plate having an opening formed therein, and a template pattern located within said opening; and
   said socket means is carried by said template pattern.

5. A template assembly, according to claim 4, wherein: said socket means comprises a plurality of nozzle-receiving sockets; and said template pattern has a plurality of bores formed therethrough, the bores thereof carrying therewithin said plurality of nozzle-receiving sockets.

6. A template assembly, according to claim 1, further comprising:
means coupled to said jig means providing a bearing surface for disposing the workpiece thereupon.

7. A template assembly, according to claim 6, wherein: said bearing surface means comprises a back-up plate.

8. A template assembly, according to claim 6, wherein: the bearing surface of the means so-called is knurled.

9. A template assembly, according to claim 4, further comprising:
a back-up plate providing a bearing surface for disposing the workpiece thereupon;
said back-up plate having a tang extending perpendicularly therefrom; and
wherein said framing plate has a slot formed therethrough to receive said tang to locate said back-up plate in proper positioning relative said framing plate.

10. A template assembly, according to claim 1, wherein:
said jig means has means for effecting correct alignment of the workpiece relative the nozzle.

11. A template assembly, according to claim 10, wherein:
said alignment-effecting means comprises at least one edge surface of said jig means.

12. A template assembly, according to claim 6, wherein:
said bearing surface means comprises a back-up plate having an irregular bearing surface, the irregularity of said surface being effective to cause the formation of irregularity-surfaced plastic products thereupon.

13. A template assembly, according to claim 1, wherein:
said nozzle engaging/positioning means includes means for positioning and repetitively repositioning the nozzle relative to the workpiece in pre-determined patterns.

14. A template assembly, according to claim 1, wherein:
said resiliently mounting means includes means cooperative with said nozzle engaging/positioning means for transmitting the weight and force of the molding apparatus to the workpiece.

15. A template assembly, according to claim 1, wherein:
said nozzle engaging/positioning means includes means for sealingly engaging a surface of the workpiece.

16. A template assembly, according to claim 1, wherein:
said nozzle engaging/positioning means includes means for sealingly engaging a surface of the nozzle.

References Cited
UNITED STATES PATENTS

| | | | |
|---|---|---|---|
| 1,887,993 | 11/1932 | Conner et al. | 18—5(M) |
| 1,973,117 | 9/1934 | Sklar | 18—5(M) |
| 2,332,856 | 10/1943 | Kalajian | 18—42(D) |
| 2,415,961 | 2/1947 | Nast | 18—42(D) |
| 2,443,826 | 6/1948 | Johnson | 18—42(D) |
| 2,494,777 | 1/1950 | Patterson et al. | 18—42(D) |
| 2,500,258 | 3/1950 | Mazzoni | 18—36 |
| 2,697,253 | 12/1954 | Kruft | 18—5(M) |

J. SPENCER OVERHOLSER, Primary Examiner

R. L. SPICER, JR., Assistant Examiner

U.S. Cl. X.R.

18—1